United States Patent
Pernites et al.

(10) Patent No.: US 10,472,552 B2
(45) Date of Patent: Nov. 12, 2019

(54) SPACER FLUIDS FOR CEMENTING WELL BORES

(71) Applicant: BJ Services, LLC, Tomball, TX (US)

(72) Inventors: Roderick B. Pernites, Spring, TX (US); Angel Gonzalez, Katy, TX (US); Felipe Padilla Florencia, Spring, TX (US)

(73) Assignee: BJ Services, LLC, Tomball, TX (US)

( * ) Notice: Subject to any disclaimer, the term of this patent is extended or adjusted under 35 U.S.C. 154(b) by 0 days.

(21) Appl. No.: 15/671,907

(22) Filed: Aug. 8, 2017

(65) Prior Publication Data

US 2019/0048247 A1    Feb. 14, 2019

(51) Int. Cl.
| | | |
|---|---|---|
| C09K 8/40 | (2006.01) | |
| E21B 21/00 | (2006.01) | |
| E21B 33/14 | (2006.01) | |
| E21B 37/00 | (2006.01) | |

(52) U.S. Cl.
CPC .............. *C09K 8/40* (2013.01); *E21B 21/003* (2013.01); *E21B 33/14* (2013.01); *E21B 37/00* (2013.01)

(58) Field of Classification Search
CPC combination set(s) only.
See application file for complete search history.

(56) References Cited

U.S. PATENT DOCUMENTS

| | | | |
|---|---|---|---|
| 4,083,407 A * | 4/1978 | Griffin, Jr. | ............... C09K 8/40 106/618 |
| 7,293,609 B2 | 11/2007 | Dealy et al. | |
| 7,867,954 B2 | 1/2011 | Warrender et al. | |
| 8,741,057 B1 | 6/2014 | Chatterji et al. | |
| 9,512,345 B2 | 12/2016 | Lende et al. | |
| 9,561,983 B2 | 2/2017 | Thomas et al. | |
| 9,611,174 B2 | 4/2017 | Thomas et al. | |
| 2005/0173117 A1 | 8/2005 | Roddy | |
| 2010/0044057 A1* | 2/2010 | Dealy | ...................... C09K 8/40 166/381 |
| 2014/0048267 A1* | 2/2014 | Pisklak | ................. C04B 40/065 166/292 |
| 2014/0076551 A1 | 3/2014 | Pelletier et al. | |
| 2014/0144635 A1 | 5/2014 | Nguyen et al. | |
| 2014/0158354 A1 | 6/2014 | Kumar et al. | |
| 2014/0318764 A1 | 10/2014 | Chatterji et al. | |
| 2015/0315875 A1 | 11/2015 | Chatterji et al. | |
| 2015/0322327 A1 | 11/2015 | Chatterji et al. | |
| 2016/0017688 A1 | 1/2016 | Chatterji et al. | |

(Continued)

FOREIGN PATENT DOCUMENTS

| | | |
|---|---|---|
| WO | 2014/066737 A1 | 5/2014 |
| WO | 2017/034582 A1 | 3/2017 |
| WO | 2017/074301 A1 | 5/2017 |

OTHER PUBLICATIONS

CR Minerals, Safety Data Sheet—CR Minerals Pozzolan Tephra NP, Tephra WP, Tephra UF (undated).

(Continued)

*Primary Examiner* — Angela M DiTrani Leff
(74) *Attorney, Agent, or Firm* — Keith B. Willhelm

(57) ABSTRACT

Spacer fluids are provided for use in cementing liners in oil and gas wells. The fluids comprise pumice and a suspending agent. Pumice is the first-in weighting agent and is added in amounts sufficient to stabilize the rheology of the fluid over time and temperature.

20 Claims, 9 Drawing Sheets

(56) References Cited

U.S. PATENT DOCUMENTS

| | | |
|---|---|---|
| 2016/0046853 A1 | 2/2016 | Chatterji et al. |
| 2016/0046854 A1 | 2/2016 | Gordon et al. |
| 2016/0214901 A1 | 7/2016 | Muthusamy et al. |
| 2016/0264840 A1 | 9/2016 | Nelson |
| 2016/0369152 A1 | 12/2016 | Lende et al. |
| 2017/0114266 A1* | 4/2017 | Bryant .................. C09K 8/035 |
| 2017/0145285 A1 | 5/2017 | Lafitte et al. |
| 2017/0158559 A1 | 6/2017 | Thomas et al. |

OTHER PUBLICATIONS

CR Minerals, Saftey Data Sheet—CR Minerals: Tephra RFA (undated).
CR Minerals, Tephra® (undated).
CR Minerals, Tephra Pozzolan (undated).
CR Minerals, Tephra® RFA (undated).
Hess Pumice Products, Hess Pumice Fact Sheet (Rev. E—Oct. 5, 2016).
Hess Pumice Products, The Ideal Alternative, Pumice Instead of Fly Ash (undated).
Hess Pumice Products, Typical Technical Properties (Pumice) (undated).
Navarrete, R.C. et al., New Bio-Polymers for Drilling, Drill-in, Completions, Spacer Fluids and Coiled Tubing Applications, Doc. ID SPE-62790-MS (Soc. Petroleum Engineers © 2000) (abstract).

* cited by examiner

Test Fluid Compositions

| Fluid | Density (ppg) | Weighting Agent | WA Load (ppg) | Welan Gum (ppg) | Water (ppg) | WA Load (wt%) | Welan Gum (wt%) | Water (wt%) |
|---|---|---|---|---|---|---|---|---|
| C1 | 10.0 | Fly Ash | 2.743 | 0.05476 | 7.199 | 27.4 | 0.55 | 72.0 |
| C2 | 11.0 | Fly Ash | 4.395 | 0.08786 | 6.511 | 40.0 | 0.80 | 59.2 |
| C3 | 12.0 | Fly Ash | 6.048 | 0.1210 | 5.824 | 50.4 | 1.01 | 48.6 |
| N1 | 9.97 | Pumice 1 | 2.743 | 0.05476 | 7.171 | 27.5 | 0.55 | 71.9 |
| N2 | 9.97 | Pumice 2 | 2.743 | 0.05476 | 7.171 | 27.5 | 0.55 | 71.9 |
| N3 | 9.97 | Pumice 3 | 2.743 | 0.05476 | 7.171 | 27.5 | 0.55 | 71.9 |
| N4 | 9.96 | Pumice 1 | 2.743 | 0.02738 | 7.180 | 27.5 | 0.27 | 72.1 |
| N5 | 9.96 | Pumice 3 | 2.743 | 0.02738 | 7.180 | 27.5 | 0.27 | 72.1 |
| N6 | 10.0 | Pumice 3 | 2.798 | 0.05476 | 7.147 | 28.0 | 0.55 | 71.5 |
| N7 | 11.0 | Pumice 3 | 4.512 | 0.04405 | 6.438 | 41.0 | 0.40 | 58.6 |
| N8 | 12.0 | Pumice 3 | 6.238 | 0.02976 | 5.724 | 52.0 | 0.25 | 47.8 |

*FIG. 2*

Viscosity (FDR) vs Shear Rate (rpm) and Temperature (°F)

| Fluid | C1: Fly Ash | | | | N1: Pumice 1 | | | | N2: Pumice 2 | | | | N3: Pumice 3 | | | |
|---|---|---|---|---|---|---|---|---|---|---|---|---|---|---|---|---|
| Density | 10.00 ppg | | | | 9.97 ppg | | | | 9.97 ppg | | | | 9.97 ppg | | | |
| RPM | RT | 125°F | 190°F | 190°F¹ | RT | 125°F | 190°F* | 190°F¹ | RT | 125°F | 190°F | 190°F¹ | RT | 125°F | 190°F | 190°F¹ |
| 300 | 20 | 28 | 18 | NA² | 23 | 20 | 29 | 27 | 18 | 19 | 23 | 21 | 22 | 23 | 21 | 36 |
| 200 | 17 | 23 | 12 | NA² | 19 | 17 | 30 | 24 | 17 | 16 | 21 | 23 | 17 | 20 | 17 | 38 |
| 100 | 13 | 15 | 9 | NA² | 13 | 13 | 23 | 16 | 12 | 11 | 22 | 16 | 11 | 16 | 14 | 18 |
| 60 | 11 | 14 | 8 | NA² | 11 | 10 | 16 | 14 | 9 | 9 | 13 | 17 | 9 | 23 | 13 | 15 |
| 30 | 9 | 9 | 7 | NA² | 8 | 8 | 12 | 12 | 7 | 7 | 10 | 10 | 7 | 8 | 11 | 13 |
| 6 | 6 | 6 | 6 | NA² | 5 | 5 | 8 | 8 | 3 | 4 | 5 | 6 | 5 | 5 | 7 | 9 |
| 3 | 5 | 4 | 6 | NA² | 4 | 4 | 5 | 6 | 3 | 3 | 4 | 4 | 5 | 5 | 5 | 8 |

1 – tested at 190° F after being held at temperature for 2 hours.
2 – not tested due to extreme separation of fluid.

*FIG. 6*

Viscosity (FDR) vs Shear Rate (rpm) and Temperature (°F)

| Fluid | C1: Fly Ash | | N6: Pumice 3 | | C2: Fly Ash | | N7: Pumice 3 | | C3: Fly Ash | | N8: Pumice 3 | |
|---|---|---|---|---|---|---|---|---|---|---|---|---|
| Density | 10 ppg | | | | 11 ppg | | | | 12 ppg | | | |
| RPM | RT | 190°F | RT | 190°F | RT | 190°F | RT | 190°F | RT | 190°F | RT | 190°F |
| 300 | 20 | 18 | 19 | 19 | 43 | 20 | 22 | 32 | 106 | 39 | 57 | 53 |
| 200 | 17 | 12 | 14 | 14 | 37 | 13 | 19 | 24 | 88 | 22 | 50 | 48 |
| 100 | 13 | 9 | 10 | 11 | 28 | 8 | 14 | 18 | 67 | 15 | 41 | 41 |
| 60 | 11 | 8 | 8 | 9 | 23 | 5 | 13 | 14 | 56 | 13 | 36 | 38 |
| 30 | 9 | 7 | 6 | 7 | 19 | 4 | 12 | 12 | 47 | 9 | 33 | 34 |
| 6 | 6 | 6 | 4 | 4 | 13 | 2 | 8 | 11 | 36 | 8 | 25 | 22 |
| 3 | 5 | 6 | 4 | 4 | 12 | 2 | 9 | 10 | 29 | 7 | 15 | 18 |

*FIG. 7*

SPACER FLUIDS FOR CEMENTING WELL BORES

FIELD OF THE INVENTION

The present invention relates to fluids used in oil and gas wells and, and more particularly, to non-settable aqueous fluids used in cementing wells and which are weighted and have stable rheology over time and temperature.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit. The drilling mud also carries cuttings from the drilling process back to the surface as it travels up the well bore. As drilling progresses downward, the drill string is extended by adding more pipe sections or "joints."

A modern oil well typically includes a number of tubes extending wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger." A well may include a series of smaller liners, and may extend for many thousands of feet, commonly up to and over 25,000 feet.

As noted, liners are cemented in the well bore as the well is constructed. That is, the liner necessarily is smaller than the well bore in which it is installed. That gap between the liner and the well bore is referred to as the annulus, and it is filled with cement after the liner has been installed. The cement helps to secure the liner in the well bore and protect it against corrosion and erosion. It also supports the borehole walls from collapse. Most importantly, the cement is intended to form a complete seal around the liner. Hydrocarbons and other fluids in the formation thus are prevented from migrating to the surface. If the liner leaks, the cement also helps to ensure that fluids flowing through the liner do not contaminate the surrounding formation, and especially water-bearing formations. A complete seal also gives more precise control over stimulation processes, such as fracturing and acidizing, and avoids unintentional stimulation of untargeted zones.

The liner is cemented in the well bore by injecting cement, that is, a cementitious, settable slurry down the liner and allowing it to flow up the annulus. The cement is allowed to set, that is, solidify and harden into what hopefully will be a continuous seal throughout the annulus. The chemical composition and properties of drilling mud and cement slurries, however, are quite different. If drilling mud mixes with the cement slurry, the cement will not set properly. Drilling mud, especially gelled drilling muds, also can be difficult to displace from the well bore. Other drilling muds, such as oil-based and synthetic muds, contaminate the surface of the well bore. Residual drilling mud and oily residue can prevent the cement from forming an intimate, continuous bond with the liner and formation. The cement may be weakened in certain areas, or there may be flow paths through it.

The liner and well bore, therefore, typically must be cleaned before cement is injected. Fluid may be injected under turbulent flow to thin and disperse drilling mud—a process referred to as washing or flushing. In addition, a volume or "pad" of fluid typically will be injected ahead of the cement. The pad of fluid, commonly referred to as a cement spacer, separates the cement from the drilling mud. It also will displace drilling mud and clean the well bore.

Spacers may include additives designed to thin the mud. Especially if the drilling mud is oil-based, surfactants will be added to ensure that the well bore is water-wetted and that there will be intimate contact with the aqueous cement. It is essential, however, that the spacer fluid be heavier than the drilling mud. That is, the spacer must have a greater density than the mud which it is intended to displace. It also must be thicker, than is, it must have a higher viscosity and yield point than the drilling mud. Spacer fluids are water based, however, and water typically is both lighter and thinner than drilling muds.

Thus, spacer fluids typically incorporate weighting agents, such as fly ash and barite. While they may have other effects, weighting agents primarily are intended to increase the density of the spacer. They typically are fine, relatively inert solid particulates. A gelling and suspending agent, such as welan, gellan, xanthan, and galactomannan gums, will be added to suspend the weighting agent particles. The suspension agent also will tend to increase the viscosity and yield strength of the spacer fluid, thus increasing its effectiveness in pushing out the drilling mud.

While many particulates have been identified as potential weighting agents, most commercial spacer fluids rely on fly ash, barite, calcium carbonate, hematite, and hausmannite to increase the density of the fluid. The economics and characteristics of a particular well may render it more suitable to a particular spacer fluid and cement. The fluids may provide extraordinary results in one well and be completely unsuitable for use in another. Thus, general statements should be taken as such, and not as definitive, immutable principles. Nevertheless, such weighting agents have been used widely and are viewed by many as providing superior spacer fluids.

At the same time, conventional spacers using the more common weighting agents suffer disadvantages. For example, a weighted spacer fluid should maintain a stable viscosity and hold solids in suspension over time and temperature. If the fluid becomes too thin once it is injected into a well, the weighting agent may settle out. It also may no longer be able to displace drilling mud from the liner. Residual weighting agents and mud can impair the operation of tools in the liner or the continuity of cement in the annulus.

On the other hand, if a weighted fluid becomes too thick, friction between the fluid and liner will increase. The liners, as noted, may extend for many thousands of feet, and friction losses over such distances can be significant. Greater pressure will be required to pump the fluid, increasing the cost of the operation. Increased hydraulic pressure also can damage the formation by pushing drilling mud or other fluids into the formation.

Such considerations are especially critical if a cementing operation is interrupted for any reason. The spacer fluid may remain in a well, and be subject to elevated temperatures in the well for extended periods of time. Cement jobs also have become more extensive. Liners have greatly increased in length over the past several years, as has the amount of spacer fluid pumped through the well. The bore hole may extend as far as 7,000 feet and may require over 150 barrels of spacer to clean it. Thus, even if all goes well, the residence time of spacer fluids in the well may be substantial.

The rheology of conventional spacer fluids, however, may not be stable under such conditions. The weighting agent may tend to settle out in many fluids, or the fluid tends to thicken if its residence time in the well is extended from any reason.

The statements in this section are intended to provide background information related to the invention disclosed and claimed herein. Such information may or may not constitute prior art. It will be appreciated from the foregoing, however, that there remains a need for new and improved fluids for spacer fluids and, and more particularly, to spacer fluids that are more tolerant of delayed, interrupted, and extended cementing operations. Such disadvantages and others inherent in the prior art are addressed by various aspects and embodiments of the subject invention.

SUMMARY OF THE INVENTION

The subject invention, in its various aspects and embodiments, relates generally to treatment fluids for oil and gas wells. The treatment fluids are non-settable weighted aqueous fluids which may be used, for example, as spacer fluids to clean a well in preparation for cementing a liner in a well. The invention encompasses various embodiments and aspects, some of which are specifically described and illustrated herein.

One aspect of the invention provides for a non-settable weighted aqueous well treatment fluid which comprises pumice and a suspending agent. The pumice comprises at least about 40 wt % of weighting agents present in the fluid. Other embodiments provide such fluids where the pumice comprises at least about 60 wt % of weighting agents in the fluid or at least about 80 wt % of weighting agents in the fluid. Still other embodiments provide such fluids having a density of from about 8.5 to about 13 ppg or from about 9 to about 12 ppg.

Additional embodiments of the invention provide non-settable weighted aqueous treatment fluids which comprise one or more primary weighting agents and a suspending agent. The primary weighting agents are selected from the group consisting of pumice and fly ash. The pumice comprises at least about 40 wt % of the primary weighting agents. When the fluid has a density of less than about 13 ppg, the fluid is substantially free of secondary weighting agents. Other embodiments are directed to such fluids which are substantially free of secondary weighting agents when the fluid has a density of less than about 12 ppg or when it has a density of less than about 11 ppg.

In other aspects and embodiments, the subject invention provides non-settable weighted aqueous treatment fluids which comprise pumice in an amount from about 1 to about 8 ppg and a suspending agent. Additional embodiments provide such fluids where the amount of pumice is from about 2 to about 7 ppg or from about 3 to about 6 ppg. Yet other embodiments provide fluids such fluids having a density of from about 8.5 to about 13 ppg or from about 9 to about 12 ppg.

Still other embodiments provide non-settable weighted aqueous treatment fluids which comprise pumice and a suspending agent. The fluids have a time-temperature stability factor of about 10% or less. Other embodiments have a time-temperature stability factor of about 5% or less or about 3% or less. Further embodiments provide such fluids where pumice comprises at least about 40 wt % of weighting agents in the fluid, or where it comprises at least about 60 wt % or at least about 80 wt % of weighting agents in the fluid. Still other embodiments provide such fluids where the fluid is weighted with from about 1 to about 8 ppg of pumice, or from about 2 to about 7 ppg of pumice, or from about 3 to about 6 ppg of pumice.

Additional embodiments of the subject invention provide non-settable weighted aqueous treatment fluids which comprise weighting agents and a suspending agent. The weighting agents consist essentially of weighting agents selected from the group consisting of pumice and fly ash. The pumice comprises at least about 40 wt % of the weighting agents. In other embodiments, such fluids pumice comprises at least about 60 wt % of the weighting agents or at least about 80 wt % of the weighting agents. In still other embodiments the weighting agents consist essentially of pumice.

Further embodiments are directed to such fluids where the suspending agent is selected from the group consisting of natural and synthetic polymer suspending agents and mixtures thereof. Other embodiments are directed to fluids where the suspending agent is a natural gum or mixtures thereof, or where it is welan gum. Yet other embodiments are directed to such fluids where the suspending agent is present in an amount from about 0.02 to about 0.2 ppg.

The subject invention also provides for methods of treating a well, including methods of cleaning a well in preparation for injecting a cement composition into the well. The method comprises injecting a novel treatment fluid into the well in advance of the cement composition. The novel treatment fluid is energized to displace fluids present in the well.

Other embodiments of the subject invention provide methods of stabilizing the rheology of a non-settable weighted aqueous well treatment fluid over time and temperature. The method comprises weighting the fluid with pumice in an amount effective to provide the fluid with a time-temperature stability factor of less than about 10% or less. Other embodiments of the methods utilize fluids with a time-temperature stability factor of about 5% or less or about 3% or less. further embodiments utilize such fluids where pumice comprises at least about 40 wt %of weighting agents in the fluid, or where it comprises at least about 60 wt % or at least about 80 wt % of weighting agents in the fluid. Still other embodiments utilize such fluids where the fluid is weighted with from about 1 to about 8 ppg of pumice, or from about 2 to about 7 ppg, of pumice, or from about 3 to about 6 ppg of pumice.

Still other embodiments provide methods of cementing a well. The methods comprise providing a non-settable weighted aqueous cleaning fluid. The rheology of the cleaning fluid has been stabilized over time and temperature according to the novel methods. The cleaning fluid is injected into the well and energized to displace fluids in the well. A cementitious slurry is injected into the well after the cleaning fluid.

Finally, still other aspect and embodiments of the invention will provide novel fluids and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

BRIEF DESCRIPTION OF THE DRAWINGS

FIG. 2 is a table showing the composition and certain properties of the fluids tested in Examples 1-8.

FIGS. 6-7 are tables reporting the data collected, respectively, in Examples 4 and 5 showing the viscosity of test fluids versus shear rate and temperature.

Figure 1A:
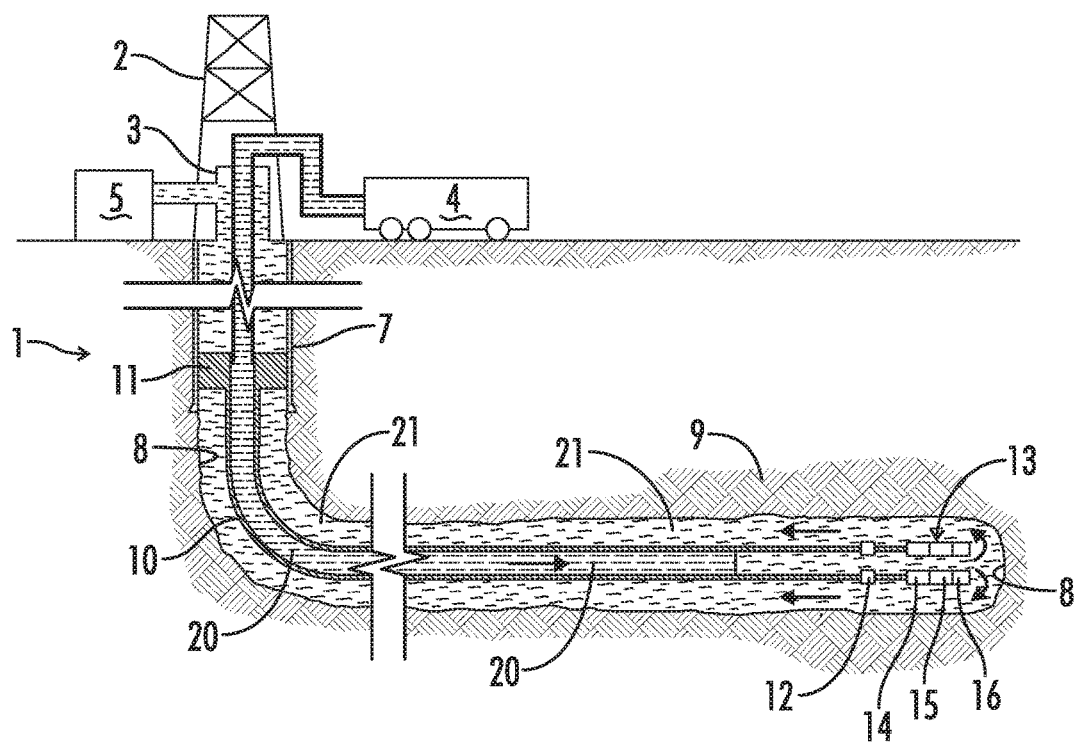
FIG. 1A is a schematic illustration of a liner assembly 10 being cleaned by a spacer fluid 20 of the subject invention in preparation for cementing liner 10 in a bore 8 of a well 1, wherein spacer fluid 20 is displacing a drilling mud 21 present in well 1.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to non-settable weighted aqueous fluids used in oil and gas wells, and especially to spacer fluids that are used to clean a well in preparation for cementing a liner in a well. As used herein, a spacer fluid is intended to reference fluids that are used to separate or displace fluids in a well. Cement spacer fluids are those fluids that are injected into a well ahead of a cement slurry to displace fluid in the well or to clean the well.

The novel spacer fluids are weighted with pumice. It is believed that pumice will add weight to the spacer fluids while providing them with more stable rheology over time and temperature. Various specific embodiments will be described below. For the sake of conciseness, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The novel treatment fluids may be used for various well operations, but are particularly useful as spacer fluids for cementing operations. There are many different approaches to cementing a liner. Likewise, many different systems will be used to prepare and deliver the fluids into a well. The novel treatment fluids in general may be used in any such conventional methods and systems.

Overview of Cementing Operations

The use and application of the novel treatment fluids will be described by reference to FIGS. 1 which schematically illustrate a cementing operation, that is, a cement job. As may be seen in FIG. 1A, a well 1 is serviced by a derrick 2, a cementing head 3, and a cement trailer 4. As described further below, cement trailer 4 will be used to prepare novel spacer fluid 20 and cement slurry 22. Pumps on cement trailer 4 will be used to introduce spacer fluid 20 and cement slurry 22 into well 1. Other surface equipment (not shown) will be used in the operation, including retention tank 5 where fluids displaced from well 1 will be held for disposal or recycling.

The upper portion of well 1 is provided with a casing 7, while the lower portion is an open bore 8 extending generally horizontally through a hydrocarbon bearing formation 9. A liner assembly 10 has been suspended from casing 7 by a hanger assembly 11 and extends through open bore 8. Liner assembly 10 includes various tools, including toe valve 12 and a float assembly 13. Float assembly 13 typically includes various tools that assist in running liner 10 into well 1 and cementing it in bore 8, such as a landing collar 14, a float collar 15, and a float shoe 16.

FIG. 1A depicts well 1 as liner 10 and bore 8 are being cleaned by spacer fluid 20. A quantity or "pad" of spacer fluid 20 is being pumped from trailer 4 into well 1. As spacer 20 is pumped, it will displace drilling mud 21 or other fluids present in liner 10 and bore 8. Drilling mud 21 will flow up the annulus between liner 10 and bore 8 to the surface where it is diverted into retention tank 5.

Figure 1B:
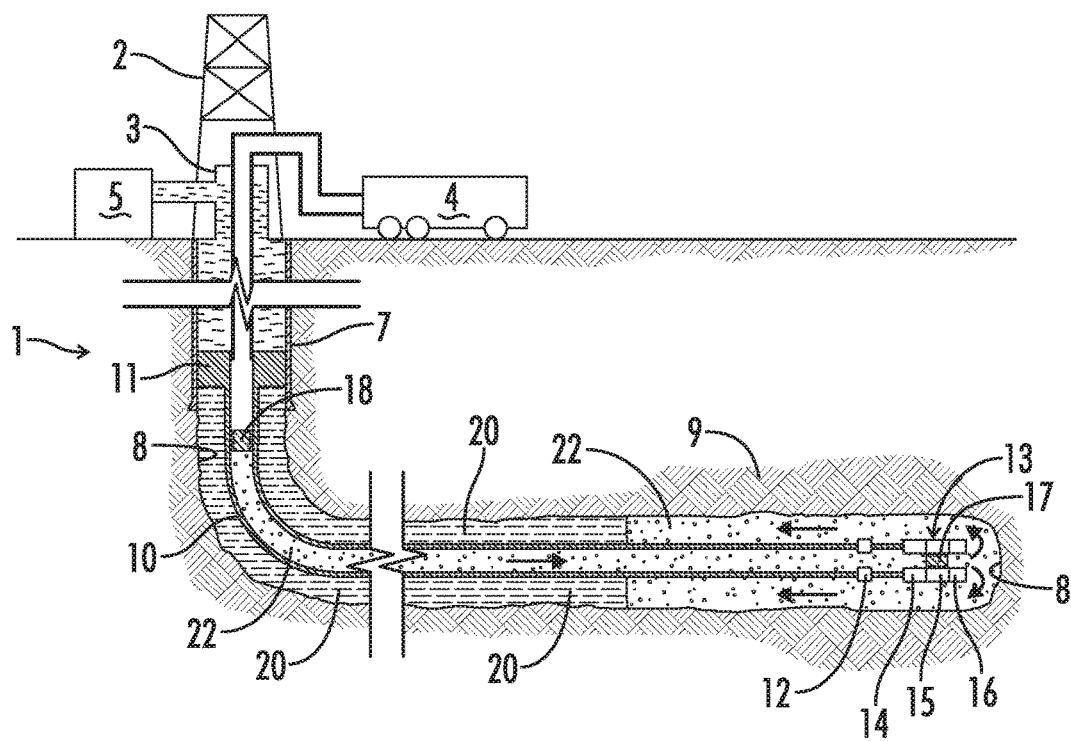
FIG. 1B is a schematic illustration of liner assembly 10 being cemented in bore 8 of well 1, which shows a cement slurry 22 being pumped into liner 10 behind spacer fluid 20.
Figure 1C:
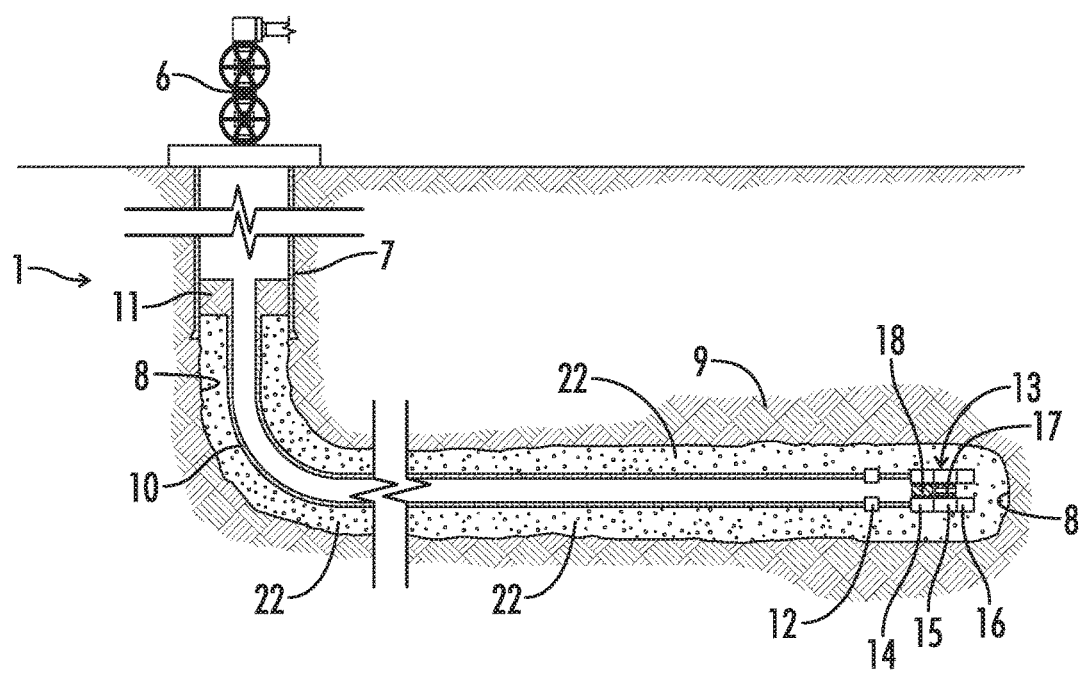
FIG. 1C is a schematic illustration of liner 10 cemented in bore 8 of well 1.

FIG. 1B depicts well 1 as liner 10 is being cemented in bore 8. Cement 22 is being pumped through liner 10 into bore 8. Typically, a "bottom" plug 17 will be deployed in advance of cement 22. It separates cement 22 from spacer fluid 20 as it moves through liner 10. As shown in FIG. 1B, bottom plug 17 will land on float collar 15 in float assembly 13. Bottom plug 17 has been opened by increasing pressure behind cement 22, allowing cement 22 to flow out the lower end of liner 10 and up into the annulus. A top or "wiper" plug 18 is being pumped behind cement 22. It follows cement 22 as it flows through liner 10. Wiper plug 18 will help clean and remove cement 22 from the inside of liner 10. It will pass through toe valve 12 and eventually seat on landing collar 14, as shown in FIG. 1C.

Pumping will continue until cement 22 completely fills the annulus between liner 10 and bore 8. It then will be allowed to set, as seen in FIG. 1C. Cement 22 now helps to support liner 10 in well bore 8 and forms a complete seal around liner 10. Derrick 2 and cementing head 3 have been replaced by a well head 6. Well head 6 may be used in conducting other well operations, such as fracturing or other stimulation operations.

It will be noted that methods and systems for cementing operations are complex and varied. FIG. 1 are greatly simplified schematic representations of a common cementing operation. Production liner 10 is shown only in part as such liners may extend for a substantial distance. It also will be appreciated that the course of the well bore may not necessarily be as depicted schematically in FIG. 1. Depending on the location and orientation of the hydrocarbon bearing formation to be accessed, the course of the well bore may be vertical, or more or less deviated in any number of ways.

FIG. 1 also depict cementing of a liner and, more specifically, a production liner which may be used to stimulate and produce hydrocarbons from the well. A "liner," however, can have a fairly specific meaning within the industry, as do "casing" and "tubing." In its narrow sense, a "casing" is generally considered to be a relatively large tubular conduit, usually greater than 4.5" in diameter, that extends into a well from the surface. A "liner" is generally considered to be a relatively large tubular conduit that does not extend from the surface of the well, and instead is supported within an existing casing or another liner. It is, in essence, a "casing" that does not extend from the surface. "Tubing" refers to a smaller tubular conduit, usually less than 4.5" in diameter. The novel fluids and operations, however, are not limited in their application to liners as that term may be understood in its narrow sense. They may be used to advantage in liners, casings, tubing, and other tubular conduits or "tubulars" as are commonly employed in oil and gas wells.

The fluid delivery system also has been greatly simplified, as have cementing procedures. For example, a fluid "train" consisting of pads of additional fluids other than spacer 20 and cement 22 often are used in cement jobs. A pad of fluid may be pumped into the well under turbulent flow to "flush" the well. The liner also may incorporate other tools to assist in the process, such as return flow diverters which allow fluid returning up the annulus to flow past the liner hanger. The spacer fluid may or may not be circulated completely out of the well. It is believed the novel fluids may be used in the context of many known systems and methods for cementing a well. An appropriate system and method may be selected with routine effort by workers in the art. Nevertheless, it is believed the methods and systems described herein will provide an understanding of the broader context in which the novel fluids may be used.

The novel treatment fluids are non-settable weighted aqueous fluids. Broader embodiments comprise fluids having a suspending agent which are weighted with pumice. In other embodiments, the fluids may comprise other components. As discussed further below, it is believed that using pumice to weight the fluids will provide the fluids with more stable rheology over time and temperature. Thus, for example, it is expected that the fluid will be more tolerant of delays and interruptions in cementing operations, and more conducive to longer cementing operations.

Base Fluid

The base fluid of the novel treatment fluids primarily serves to provide weight and to transport other components into the well. The base fluid is water, and it will be understood that water will include fresh water and salt water. "Salt water" as used herein may include unsaturated salt water or saturated salt water "brine systems", such as a NaCl, or KCl brine, as well as heavy brines including $CaCl_2$, $CaBr_2$, and $KCO_2H$.

The base fluid will constitute a substantial portion of the fluid. For less dense fluids, often referred to as "lighter" fluids, it will represent a larger portion, up to 95 to 99 percent by weight (wt %). As the density of the fluid increases, or as it becomes "heavier," the base fluid will represent a smaller portion, perhaps as low as 30 to 40 wt %. The exact proportion of base fluid, however, will depend on the target density for a particular fluid. The amount of water generally will be coordinated with the other components to provide a specific density. One of ordinary skill in the art, with the benefit of this disclosure, will recognize the appropriate amount to use for a chosen application.

Pumice

The novel treatment fluids comprise pumice. Pumice serves to increase the density of the fluid and thus serves as a weighting agent in the novel fluids. As discussed below, it also is believed that pumice stabilizes the rheology of the fluid over time and temperature.

Pumice is a rock of volcanic origin. It is characterized not so much by its chemical composition, but by its micro structure. It is a rock consisting of highly micro vesicular glass, with or without crystals, which results from rapid and simultaneous depressurization and cooling. As magma rises through a vent, it is depressurized. Gas dissolved in the magma is released and creates a froth which freezes upon ejection into the atmosphere. The vesicles, that is, the tiny chambers of trapped gas within pumice make it very light, and pumice will float on water.

Most pumice is silicic, ranging from about 65% to 75% silicon dioxide ($SiO_2$) with lesser amounts of aluminum oxide ($Al_2O_3$) and trace amounts of other oxides, and was formed from dacitic to rhyolitic magma. Pumice also may be felsic, or it may have intermediate compositions such as andesite, pantellerite, phonolite, and trachyte. Basaltic pumice also is known.

In its powdered form, pumice is referred to a pumicite, and it is in its powdered form that pumice is incorporated into the novel cement spacers. Preferably, the pumice will have particle sizes from about 1 to about 200 microns, preferably from about 5 to about 20 microns, and more preferably from about 5 to 10 microns. It will be appreciated that particle sizes are determined by various methods in the industry, and are not always readily disclosed by suppliers. Wire mesh screens may be used to size particles, for example. More commonly, however, particle size analyzers which measure particle size by diffracting laser beams off a sample will be used.

Pumicite is available commercially from various sources. The pumice typically is mined from deposits, and then ground, sifted, or otherwise processed into product of specified particle sizes and grades. Since it is a natural product, its chemical composition and physical properties may vary, even when sourced from a single deposit. It also will be understood, therefore, that in the context of the present disclosure, pumice will be understood as not being limited to particular minerals or mixtures of minerals. Similarly, it encompasses not only "pure" pumice, but also to pumice mixed with such other particulates and associated minerals as may be present in commercially available pumice produced from natural sources. Suppliers of pumice include Hess Pumice Products, Malad City, Id., General Pumice Products, Carlsbad, Calif., and CR Minerals, Española, N. Mex.

Pumice generally will be added in amounts designed to provide the fluid with a target density and may be determined by routine effort. As a practical matter, pumice can be added in amounts sufficient to yield a fluid having a density of up to about 13 pounds/gallon (ppg). Typical fluids would be from about 8.5 to about 13 ppg. Greater amounts generally will cause the fluid to be too thick to pump. Loadings of pumice, therefore, typically will be from about 1 ppg to about 8 ppg. Other practical weightings would be from about 2 to about 7 ppg, or from about 3 to about 6 ppg pumice.

It is believed that the stabilized rheology of the novel fluids derives from the vesicular micro structure of pumice. That is, the polymers present in common suspension agents are susceptible to degradation at higher temperatures. As the polymers degrade, the viscosity of the fluid tends to diminish, making it easier for solids to settle out of suspension. The vesicular micro structure of pumice, however, allows the polymer molecules to become encapsulated and entangled in the pumice particles. The pumice particles essentially insulate the polymers, protecting them from thermal degradation. The viscosity of the fluids is less susceptible to thermal thinning, and the suspension will tend to be more stable over time and temperature.

Spacer fluids with pumice are described in U.S. Pat. No. 9,512,345 to G. Lende et al. Lende, however, suggests the use of pumice in systems which may contain hundreds of thousands of different additives falling into dozens of general categories. Those fluids which are specifically disclosed primarily comprise other weighting agents. No specific purpose for adding pumice is mentioned by Lende, nor is there any description of the general category of additives into which it might fall. In whole, the disclosure merely teaches that pumice is compatible with at least some conventional spacer fluids. It fails to recognize the significantly improved time-temperature stability of fluids weighted with pumice.

Scoria is a vesicular volcanic rock similar in structure to pumice. The vesicles, however, are somewhat larger than those in pumice, and the vesicle walls are somewhat thicker. Though still relatively light, scoria is denser than, and will sink in water. It may or may not contain crystals. Typically, it is basaltic or andesitic in composition. Given that they are similar in micro-structure and composition, and that the distinction between pumice and scoria in some respects is arbitrary, it is believed that scoria may impart similar effects. Thus, for purposes of the subject invention "pumice" shall be understood to included scoria.

As discussed below, other weighting agents may be used. If a higher density spacer is required, heavier conventional weighting agents necessarily will be used in combination with pumice. To the extent that they inordinately reduce the improved rheological stability provided by pumice, however, other, secondary weighting agents preferably are avoided.

Suspension Agent

The novel treatment fluids comprise a suspension agent. The suspension agent primarily serves to enhance the viscosity and yield point of the treatment fluid such that it is capable of suspending the particles of pumice and other weighting agents and displacing fluids in the well, preferably with minimal mixing. Accordingly, it may be selected from many conventional agents used to thicken aqueous fluids. Polymers which hydrolyze when mixed with water are a common type. As the polymer is hydrolyzed, the base fluid becomes thicker and better able to maintain solid particulates in suspension.

Such polymers include natural gums, such as welan, gellan, xanthan, diutan, and galactomannan gums. Welan gum is an exopolysaccharide produced by fermentation of sugar by the bacteria *Sphingomonas* sp. ATCC 31555. The molecule consists of repeating tetrasaccharide units with single branches of L-mannose or L-rhamnose. Gellan gum is a water-soluble anionic polysaccharide produced by the bacterium *Sphingomonas elodea* (formerly *Pseudomonas elodea*). The repeating unit of the polymer is a tetrasaccharide, which consists of two residues of D-glucose, a residue of L-rhamnose, and a residue of D-glucuronic acid connect by glycosidic bonds. Xanthan gum is a polysaccharide produced by the bacterium *Xanthomonas campestris*. It has a $C_{35}H_{49}O_{29}$ monomer. Diutan gums are heteropolysaccharides produced by the bacterium *Sphingomonas* sp. ATCC 53159. It is a tetrasaccharide, having four sugars in the backbone (glucose-glucuronic acid-glucose-rhamnose) and a side chain of two rhamnose residues attached to one of the glucose residues. Galactomannan gums are neutral, water-soluble polysaccharides consisting of a mannose backbone with galactose side groups. More specifically, they typically consist of a $\beta$-(1→4) linked D-mannopyranose backbone with $\alpha$-(1→6) linked galactopyranose side chains. They may be characterized by their mannose-to-galactose ratio, and include, in order of increasing ratio: fenugreek gum (~1:1), guar gum (~2:1), tara gum (~3:1), and locust bean gum or carob gum (~4:1). Chitosans and starches also may be suitable.

Synthetic polymers also may be used, such as high molecular weight hydroxyethyl cellulose (HEC), polyacrylate, polymethacrylate, polyethyleneimine, polyacrylamide, polyvinyl alcohol, and polyvinylpyrrolidone. Copolymers and other derivatives of such natural and synthetic polymers also hydrolyze in water. Derivatives of galactomannan gum, for example, include various copolymers thereof, such as hydroxypropyl guar (HPG) and carboxymethyl hydroxypropyl guar (CMHPG). In accordance with this aspect of the disclosure, the term "copolymer," as used herein, is not limited to polymers comprising two types of monomeric units, but is meant to include any combination of monomeric units, e.g., terpolymers, tetrapolymers, and the like.

Thus, in various embodiments the suspension agents preferably are selected from the group consisting of welan gum, gellan gum, xanthan gum, diutan gum, and galactomannan gum, including guar, tara, and carob gum, and HEC, and derivatives thereof, including HPG and CMHPG, and mixtures thereof. In this regard, it will be appreciated that in referencing a group "consisting of," it shall be understood that the reference is not only to the listed members, but to any and all subsets of the listed members.

Other suitable suspension agents may include gelatins and clays. Suitable clays include kaolinites, montmorillonite, bentonite, hydrous micas, attapulgite, sepiolite, and the like, as well as synthetic clays, such as laponite.

The suspension agents may be derived from natural products or synthesized by methods known to workers in the art. They also are commercially available, typically in the form of a dried powder, from many commercial producers and distributors of chemical II products.

The suspension agent generally will be added in amounts sufficient to provide the viscosities required for a particular application as determined by routine effort. By weight, it is a relatively small component of the fluids. The amount of suspension agent, however, may vary significantly. Using natural gums as an example, the viscosity of the fluid generally is increased by increasing the polymer concentration. It may be more cost effective, however, to use a higher molecular weight polymer or a polymer having a higher degree of hydrolysis at a relatively fixed polymer concentration. Conversely, the viscosity may be reduced by using a lower molecular weight polymer, a lower polymer concentration, or, in some cases, a polymer having a lower degree of hydrolysis.

For the most part, the amount of suspension agent will be fairly closely correlated to the amount of weighting agent and, therefore, the density of the fluid. As more weighting agents are added, more polymer generally will be required to keep the particulate matter in suspension. At lower densities, however, the amount of suspension agent may be higher relative to the weighting agent. Even if relatively little polymer is required to suspend the particulate matter, the fluid still will require a minimum thickness in order to displace fluids. Conversely, at higher densities, the particulate matter already in suspension tends to support other particulates. Somewhat less polymer relative to the amount of solids may be required.

Bearing the foregoing in mind, however, in general the suspension agent may be loaded into the fluid in amounts from about 0.02 to about 0.2 ppg (about 0.2 wt % to about 2 wt %). Preferably, it may be loaded in amounts from about 0.03 to about 0.15 ppg (about 0.25 to about 1 wt %). The precise loading of suspension agent for a particular application will be determined by the degree of viscosity to be imparted to the fluid and may be determined by routine effort.

It also will be appreciated, however, that the suspension agent may contribute to or enhance other properties of the treatment fluid. For example, in certain formations such as shale, the suspension agent also may help minimize fluid losses into a formation by forming a film or filter cake on the formation surface. The suspension agent also may tend to encapsulate clay particles and to minimize undesirable increases in viscosity caused by clay in a formation. Some suspension agents also may help to reduce friction between the fluid and a liner as it is pumped into the well.

Additives

The novel treatment fluids are believed to have significantly improved rheological properties over time and temperature primarily because they are weighted with pumice as described herein. The novel treatment fluids, however, may be used in many different wells and in many different operations presenting a variety of conditions. Thus, certain embodiments of the novel treatment fluids may comprise additives designed to enhance the performance of the fluids in other ways as may be required or desirable for specific applications. Many such additives are known to workers in the art, are commercially available from a number of sources, and in general may be used in the novel fluids provided they are compatible with the other components.

For example, if a well was drilled with oil or synthetic based drilling muds, the novel fluids preferably will incorporate a surfactant. Surfactants will help the aqueous base fluid clean the liner and well bore of oil and synthetic residues. Surfactants also will enhance the wettability, or "water-wet" of the surfaces of the liner and well bore. The aqueous cement slurry, therefore, can more effectively set and bond to the liner and bore, and it can provide a more effective seal throughout the annulus. The surfactants in general may be any of the surfactants commonly used for such purposes in spacer fluids. More common surfactants include nonylphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides, and alkene amidopropyl dimethylamine oxides. The surfactants will be added in amounts effective to allow adequate cleaning and wetting of the bore and liner surfaces. Typically, amounts from about 0.01 to about 6 wt % will suffice for such purposes.

Other such additives include fluid loss control additives, dispersants, defoamers, curing agents, salts, corrosion inhibitors, scale inhibitors, and formation conditioning agents. Preferably, such optional additives will be avoided to the extent that they adversely react with or affect the performance of the primary components of the fluids. It is generally expected that additives of the type used in non-settable weighted aqueous treatment fluids, and especially spacer fluids may be used to provide the novel fluids with additional, advantageous properties. The desirability and compatibility of such conventional additives may be determined by routine experimentation.

Pumice is a pozzolana, one of several different pozzolans of volcanic origin. Pozzolans are a broad class of siliceous or siliceous and aluminous minerals which by themselves have little or no cementitious properties. If finely divided, however, and mixed with water, they can react with lime (calcium hydroxide-$CaOH_2$), set, and form a cement. Thus, the novel weighted aqueous treatment fluids will not comprise lime or other activators, or at least not in such amounts sufficient to induce the fluids to set. There is no hard and fast definition, but workers in the art would generally regard a fluid that hydraulically sets or otherwise develops compressive strength to a level of at least about 50 psi after 24 hours as a "settable" composition.

Additional Weighting Agents

Pumice is the preferred weighting agent in the novel fluids, and preferably it will be the "first in" weighting agent. That is, to the extent that the novel fluids may be formulated to a desired density using only pumice, without the use of additional weighting agents, that is preferred. Thus, preferred embodiments of the novel non-settable weighted aqueous fluids do not comprise additional weighting agents. Lighter fluids, that is, fluids having a density of about 13 ppg or less typically may be formulated using pumice alone.

In other embodiments, including such "lighter" fluids, other weighting agents may be used. For example, as discussed below, it has been found that fluids with improved rheological stability may be weighted with lighter weighting agents, such as fly ash, along with pumice. Fly ash is a fine dust formed as a byproduct of coal combustion. It typically is sourced from coal-fired electrical power plants which collect it from flue gases as they are discharged into the atmosphere.

The components of fly ash vary widely depending on the type of coal being burned. Typically, however, fly ash includes substantial amounts of silicon dioxide, both amorphous and crystalline, calcium oxide (CaO), aluminum oxide, and iron oxide ($FeO_2$). Again, depending on the type of coal being burned, it is classified into classes. In particular, Standard C618 promulgated by ASTM International defines two types of fly ash having a carbon content and particle size which renders them suitable for use in cements. Class C fly ash is generally produced when younger lignite and subbituminous coal is burned. Class F fly ash is generally produced when harder, older anthracite and bituminous coal is burned. The primary difference between the two classes is the amount of calcium, silica, alumina, and iron in the fly ash. So-called "non-spec" fly ash does not meet ASTM C618 standards. Since it is a natural product, the specifications for "spec" fly ash can vary considerably depending on the source. Non-spec fly ash is particularly variable.

When fly ash is used, pumice preferably still constitutes a substantial portion or most of the weighting agent. Preferably, pumice will constitute at least about 40 wt %, preferably at least about 60 wt %, and more preferably at least about 80 wt % of the weighting agent. For example, 40:60 wt %, 50:50 wt %, 60:40 wt %, 70:30 wt %, 80:20 wt %, or 90:10 wt % mixtures of pumice and fly ash may be suitable. In lighter fluids having a density of less than about 13 ppg, therefore, typical loadings of fly ash may be up to about 4 to about 5 ppg (about 35 wt %).

In certain preferred embodiments, therefore, the fluid will be a lighter fluid which is substantially free of other weighting agents (less than about 5 wt % of all weighting agents) when the fluid has a density of less than about 13 ppg, or less than about 11 ppg, or less than about 10 ppg. The novel fluids also may be weighted with agents consisting essentially of agents selected from the group of pumice and fly ash, where pumice comprises a substantial portion or most of the selected agents. For example, pumice may comprise at least about 40 wt %, preferably at least about 60 wt %, or more preferably at least about 80 wt % of the selected agents. Workers in the art, with the benefit of this disclosure, will be able to identify an appropriate lighter weighting agent and to determine an amount sufficient to weight the novel fluids to a target density.

If pumice is used as the only weighting agent, or with lighter weighting agents such as fly ash, the resulting fluid will begin to thicken as more weighting agent is added. Eventually, a point will be reached where it is difficult or impossible to pump into the well. Typically, that will occur at around a density of 13 ppg. Thus, if a spacer fluid for an application requires a heavier fluid, heavier weighting agents will have to be added to the fluid. A variety of heavier weighting agents and their properties are well known to workers in the art and are commercially available from many sources. In general, the weighting agents may comprise any of the weighting agents conventionally used in non-settable weighted aqueous treatment fluids. For example, barite and hematite may be used to provide heavier fluids. Other heavier conventional weighting agents, however, may be used.

Preferably, such weighting agents will be added only when it is necessary to formulate heavier fluids. Typical loadings of heavier, secondary weighting agents in such fluids may be from about 1 to about 6 ppg. Preferably, they are loaded in amounts such that pumice still constitutes a substantial portion or most of the weighting agents. Preferably, pumice will constitute at least about 40 wt %, preferably at least about 60 wt %, and more preferably at least about 80 wt % of the weighting agent when heavier, secondary weighting agents are used.

The exact loading, of course, will depend on the desired density of the fluid and the amount of pumice already added to the fluid. Workers in the art, however, with the benefit of this disclosure, will be able to select an appropriate additional weighting agent and to load it in amounts sufficient to achieve a desired density while still taking advantage of the improved rheological stability provided by pumice. It also will be recognized that every component in a fluid makes a certain contribution to the resulting density of the fluid. Workers in the art, however, generally recognize weighting agents as solid, particulate components that are added to a base fluid for the primary purpose of controlling its density.

Making and Using the Novel Fluids

Various components and their concentrations in the novel non-settable weighted aqueous treatment fluids are described above. The choice of particular components among those generally suitable for use in the novel fluids and the concentration thereof, however, will depend on the precise chemical and physical properties of the fluid that are needed for a particular operation. Cost considerations also may come into play. Workers in the art, having the benefit of this disclosure, may optimize the formulation of the novel fluids for a particular application by reference to principles well known in the art and by routine experimentation.

Moreover, it will be appreciated that various functions and mechanisms have been ascribed to each component of the novel fluids and to their effect on the overall properties of the fluid. While such explanations are believed to be accurate, and are believed to provide useful guidance in making and using the novel fluids, it will be understood that the invention is not limited thereby. As demonstrated by the examples which follow, regardless of their respective individual properties, the mechanism by which they function, or their effectiveness in other fluids, the inclusion of pumice provides the novel non-settable weighted aqueous treatment fluids with improved rheological characteristics over time and temperature.

In particular, the novel fluids may be provided with stable viscosities across a broad range of temperatures over extended periods of time. Thus, it is expected that the fluids, when injected into a well, will maintain their viscosity and hold solids in suspension even as the fluid is heated by elevated subsurface temperatures. Similarly, they may be expected to hold their viscosity and solids for protracted residence times as may be experienced in larger, more protracted cement jobs, or if pumping is interrupted for one reason or the other. Thus, the novel fluids should provide operators with greater predictability and a more forgiving system in the event an operation does not go as planned.

More particularly, and consistent with the examples below, it is expected that the novel non-settable weighted aqueous treatment fluids may have a time-temperature stability factor ("TTSF") of less than about 10%, preferably less than about 5%, or more preferably less than about 3%. As described in further detail below, as used herein the "time-temperature stability factor" is defined as the average deviation coefficient of the fluid's viscosity (average absolute deviation of the viscosity divided by the mean viscosity) expressed in percentage and as determined in accordance with the procedures described in the examples below. The TTSF is intended to capture the concept of a steady rheology across a range of temperature and time at a constant shear rate and pressure, although there may be other ways of quantifying the concept. Regardless, it will be appreciated that a fluid's rheology over time and temperature may be stabilized by weighting the fluid with pumice, a product which is readily available, relatively inexpensive, and easy to work with.

In general, the novel treatment fluids may be made and circulated by methods and equipment well known and used by workers in the art. For example, an aqueous base fluid typically will be stored on site in tanks. A dry mixing unit will be used to mix the weighting agent, suspension agent, and any other dry components, such as a fluid loss control agent or other additive. The mixture of dry components then will be dispensed into a mixing tank on a hydration unit. The tank is provided with mixers, such as paddles, hydraulic jet mixers, and the like, which blend the dry components into the base fluid. Small amounts of additives, such as weak organic acids, dispersants, and defoamers, may be added to assist in that process. Hydraulic pumps will be used to energize the fluid and to discharge it into a cementing head, such as cementing head 3 shown in FIGS. 1A and 1B. Cementing head 3 also will divert returning fluids into, for example, retention pit 5 for treatment, reconstitution, or disposal.

The fluid may be made in batches, but typically it will be formulated "on the fly." That is, dry mixed solids will be added continuously to the base fluid as it pumped into and out of the mixing tank. Pumping rates and quantities of fluid pumped also can vary considerably depending on the fluid and the well which will be cemented. In general, however, typical cement jobs will pump from about 15 to about 150 US oil barrels (bbl) (42 gallons) of spacer fluid into the well in advance of a cement slurry, typically at rates from about 1 to about 10 bbl/min.

The novel fluids have been described for use primarily in the context of so-called "primary" cement jobs where a casing or a liner is cemented in an open well bore. It will be appreciated, however, that they may be used in other cementing operations. For example, they may be useful in remedial cement jobs, such as a "squeeze" cement jobs initiated to seal voids in a tubular string, cement sheath, gravel pack, or formation. The treatment fluids also may be used in other types of operations. They may be used, for example, to separate drilling fluids during drilling change outs or drilling fluids and a completion brine.

It also will be appreciated that when specifying ranges, such as the loading of pumice or other components in the novel fluids, such ranges are intended to describe each value in the range and ranges between any two values. For example, if pumice is specified as being loaded in amounts from about 3 to about 5 ppg, the range describes loadings of about 3 ppg, about 4 ppg, and about 5 ppg, as well as ranges from about 3 to about 4 ppg and from about 4 to about 5 ppg. Similarly, if the range is specified as less than or more s than a particular loading, it describes inclusive specific and ranges of loadings. Moreover, even when unmodified by "about" or similar terms, numbers referring to a particular quantity, level, or the like shall be understood as including the specified quantity and somewhat smaller and larger quantities as provide substantially the same effect.

Terms such as lighter and heavier, and less dense and denser at times are used to describe the novel fluids. When so used in the absence of a specific comparison, "lighter" and "less dense" fluids shall be understood as referring generally to fluids having a density of less than about 13 ppg. "Heavier" and "denser" fluids shall refer to fluids having a density greater than about 13 ppg.

EXAMPLES

The invention and its advantages may be further understood by reference to the following examples. It will be appreciated, however, that the invention is not limited thereto.

Examples

Materials, Equipment, and General Procedures

Non-settable weighted aqueous test fluids for the examples that follow were prepared using the following components:

Base fluid. Tap water from Tomball, Tex.

Suspension Agent (SA). Welan gum (WG) comprising 35 wt % welan gum and 65 wt % crystalline silica. It is commercially available as a dried power under the product name ASA-301 from BJ Services, Houston, Tex.

Weighting agent (WA)—Fly Ash (FA). Class C fly ash obtained from Rockwater Energy Solutions, Houston, Tex.

Weighting agent—Pumice 1. Pumicite described as "pumicite natural pozzolan" having a specific gravity of 2.3. Certified as a pozzolan under ASTM Standard C618N and available commercially under the product name Tephra NP from CR Minerals.

Weighting agent—Pumice 2. Pumicite described as "white pumice natural pozzolan" having a specific gravity of 2.3. Certified as a pozzolan under ASTM Standard C618N and available commercially under the product name Tephra WP from CR Minerals.

Weighting agent—Pumice 3. Pumice 3 is believed to be a mixture of pumicite and non-spec fly ash comprising at least about 40 wt % pumice. It has a specific gravity of 2.3 and 90+ % will pass a 325 mesh screen. It is certified as a Class F pozzolan under ASTM Standard C618N. It is available commercially under the product name Tephra RFA from CR Minerals.

Preparation of Fluids. Non-settable weighted aqueous test fluids were prepared using a Model 7000 constant speed blender sold by Cement Test Equipment Inc., Tulsa, Okla. The base fluid was poured into a stainless steel blender cup. The suspension agent and weighting agent then were added to the base fluid, and the fluid mixed at 2,000-2,500 revolutions per second (rpm) for at least about 2-3 minutes.

Various test fluids were prepared as described above. The density, the components, and amounts of each component for each fluid are set in FIG. 2. Component loadings are provided in pounds per gallon (ppg) and weight percent (wt %).

Conditioning of Fluids. Test fluids were heated and conditioned using a using a Model 1200 atmospheric consistometer sold by Chandler Engineering (Ametek, Inc.), Broken Arrow, Okla. The consistometer has a stationary paddle and a rotating sample cup which is disposed in an oil bath for heating samples.

For testing at 125°, the fluid was heated to the target temperature over the course of 15 minutes and conditioned at the temperature for an additional 30 minutes. For testing at 190°, the fluid was heated over the course of 30 minutes and conditioned for an additional 30 minutes. All heating and conditioning was done with constant stirring at 150 rpm.

Free Fluid Tests. Free fluid tests were performed at ambient pressures by first heating and conditioning the fluids in the Chandler consistometer at the prescribed temperatures as described above. After conditioning, 250 ml of fluid was transferred immediately into a pre-heated graduated cylinder. The mouth of the cylinder was double-sealed with latex (cut from a latex glove) and aluminum foil to avoid evaporation of water in the fluid. The cylinder then was placed upright (at 90°) in a preheated oven on a static, stable pad. The oven was maintained at the specified temperature for a period of 2 hours. The fluid in the cylinder then was visually inspected and any free water at the top of the fluid was measured.

Viscosity over Time and Temperature. The viscosity of test fluids over time and temperature was measured as reported in the Examples below. Test fluids were tested using a Model 5550 HPHT (high pressure high temperature) viscometer sold by Chandler Engineering (Ametek, Inc.), Broken Arrow, Okla. The viscometer is a concentric cylinder viscometer using a rotating sleeve (rotor) and a stationary bob. The sleeve was an R1 rotor with a radius of 1.8415 cm. The bob was a B5 bob having a radius of 1.5987 cm and a height of 7.62 cm. Test procedures and data acquisition are controlled by a computer running Chandler Rheo 5000 software. The viscometer was calibrated prior to testing using silicone oil having a viscosity of 200 centistokes (cst) obtained from Chandler Engineering according to the manufacture's standard calibration procedures.

Immediately after their preparation, approximately 41-42 milliliters (ml) of test fluid was added to the sample cup, filling the sample cup to a level a few inches above the top of the bob. Fluids were added at a temperature between 65-75° F., i.e., at room temperature (RT). The fluids were tested at 400 psi pressure and a constant shear rate of 100 revolutions per second (100 sec$^{-1}$). The sample was ramped from 75° F. to 200° F. in 25° F. intervals as follows. The heater temperature first was ramped up to 100° over the course of 20 minutes. The temperature was held at 100° F. for 30 minutes. The temperature was ramped up to each successive level over 20-minute intervals and held for 30-minute intervals until the final temperature, 200° F., was reached and held. It will be appreciated that sample temperatures lagged heater temperatures somewhat during ramp periods, but typically was within a few degrees of heater temperature during hold times. Viscosity (cP) and temperature (° F.) were recorded every minute, and plots were prepared of viscosity as a function of time and temperature. The TTSF and other statistical measures of the data may be calculated from that data.

It will be noted that the temperature changes were meant to model temperature changes that may occur as a fluid is pumped into a well. Fluid typically is pumped into the well at temperatures approximating surface temperatures, but tends to heat as it travels through a well. Downhole temperatures typically are much hotter than surface temperatures, and the fluid may be exposed to those temperatures for some time, especially if the liner is very long or pumping is interrupted. It is believed the testing protocol provides a reasonable approximation of heating over extended residence times as may occur during most operations in North American oil and gas wells.

Viscosity Over Shear Rate and Temperature. The viscosity of test fluids at various shear rates was measured as reported in the Examples below. The test fluids were tested using a Model M3600 automatic viscometer sold by Grace Instrument, Katy, Texas. The viscometer is a concentric cylinder viscometer using a rotating sleeve and a stationary bob equipped with a heated sample cup and thermocouple. The sleeve was an R1 rotor with a radius of 1.8415 cm, The bob was a B1 bob having a radius of 1.7245 cm and a height of 3.80 cm. Test procedures and data acquisition are controlled by a computer running Grace M3600DAQ™ software, The viscometer was calibrated prior to testing using a test fluid having a viscosity of 200 centipoise (cP) obtained from Grace Instruments according to the manufacture's standard calibration procedures.

Fluids were tested at a temperature between 65-75° F., i.e., at room temperature. Tests also were conducted at temperatures of 125° F. and 190° F. after heating and conditioning the fluids as described above. After preparation or conditioning, approximately 200-210 ml of test fluid was added to the sample cup, filling the sample cup to a level a few inches above the top of the bob.

The fluids were tested at the specified temperatures at ambient pressure and at various shear rates starting at 3 rpm, and then to 6 rpm, 30 rpm, 60 rpm, 100 rpm, 200 rpm, and 300 rpm. The shear rate was held steady at each level for approximately 10 seconds before adjusting the rate upward. Shear rates were controlled automatically by the Grace viscometer. Viscosity was recorded at the end of each 10 second hold interval. Because the Grace viscometer is "direct-indicating," viscosity was recorded in widely utilized Fann 35 dial readings ("FDR").

This test is designed to model the effects of changing temperature as fluids are pumped at different rates. The faster a fluid is pumped, the more shear it will experience as it travels down a liner. The viscosity of the fluid in turn generally is affected by the amount of shear. It is believed that this testing protocol, as described further below, reasonably simulates what may occur if pumping, for whatever reason, is not maintained at a constant rate or is interrupted.

Example 1

The viscosity of fluids was measured over time and temperature. The fluids were conventional fluid C1, and three novel non-settable weighted aqueous fluids, fluids N1, N2, and N3. The density of all fluids was approximately 10 ppg. Conventional fluid C1 was weighted with fly ash. The three novel fluids were weighted with different pumices, with novel fluid N3 using a mixture of pumice and fly ash.

The fluids were tested at a constant shear rate of 100 sec$^{-1}$ and at 400 psi. The temperature was ramped in 25° F. intervals from room temperature to 200° F. over the course of approximately 4 hours, and data was collected as described above. The viscosity data (cP) is presented in the graph of FIG. 3, where higher cP values indicate a thicker, more viscous fluid and lower cP values indicate a thinner, less viscous fluid.

Figure 3:
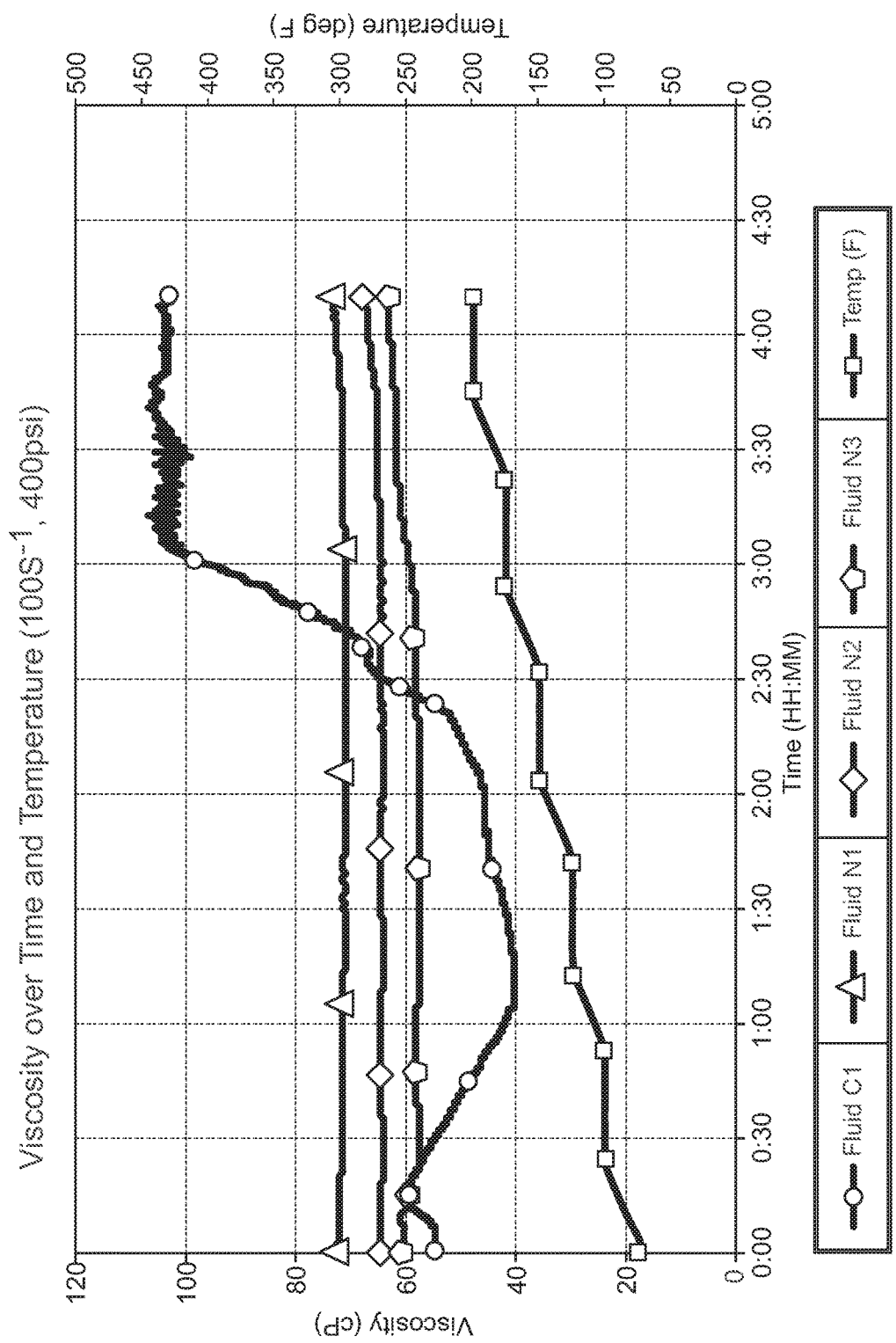
FIGS. 3-5 are graphical presentations of the data collected, respectively, in Examples 1 to 3 showing the viscosity of test fluids versus time and temperature.

As may be seen in FIG. 3, the viscosity of conventional fluid C1 weighted with fly ash varied significantly, at first becoming thinner and then rapidly becoming extremely thick. In contrast, the novel fluids N1, N2, and N3, which were weighted with pumice, all maintained an almost constant viscosity over a wide range of temperature and over the course of over four hours. Their curves are essentially flat.

The conclusions derived from the visual depictions are borne out by a statistical analysis of the data. Pertinent statistics are reported below in Table 1, where the range is the difference between the maximum and minimum viscosity readings, AAD is the average absolute deviation of the viscosity readings, and TTSF is the time-temperature stability factor (average absolute deviation divided by the average).

TABLE 1

| Fluid | Weighting Agent | Average (cP) | Range (cP) | AAD (cP) | TTSF (%) |
| --- | --- | --- | --- | --- | --- |
| C1 | Fly Ash | 67.24 | 65.89 | 22.64 | 33.67% |
| N1 | Pumice 1 | 71.41 | 3.43 | 0.4100 | 0.7153% |
| N2 | Pumice 2 | 64.76 | 2.28 | 0.4633 | 0.5741% |
| N3 | Pumice 3 | 59.12 | 5.614 | 1.616 | 2.733% |

The statistics for conventional fluid C1 (weighted with fly ash) provide some quantification of just how sensitive the fluid is to temperature. The range of viscosities was essentially equal to the average viscosity. Moreover, fluid C1 had a TTSF of about 34%, indicating that on average a particular viscosity measurement deviated ±33% from the average viscosity measurement.

In contrast, the TTSF for the novel fluids were an order of magnitude better, ranging from a high of about 2.7% for fluid N3 to a low of about 0.57% for fluid N2.

Example 2

The viscosity of another novel non-settable weighted aqueous fluid, N4, was measured over time and temperature as described in Example 1 for comparison to the data for novel fluid N1. Fluids N1 and N4 both had densities of approximately 10 ppg and were weighted with equal amounts of pumice 1. The loading of suspension agent (welan gum) in fluid N4, however, was reduced by approximately 50% as compared to fluid N1. The viscosity data is presented in the graph of FIG. 4.

Figure 4:
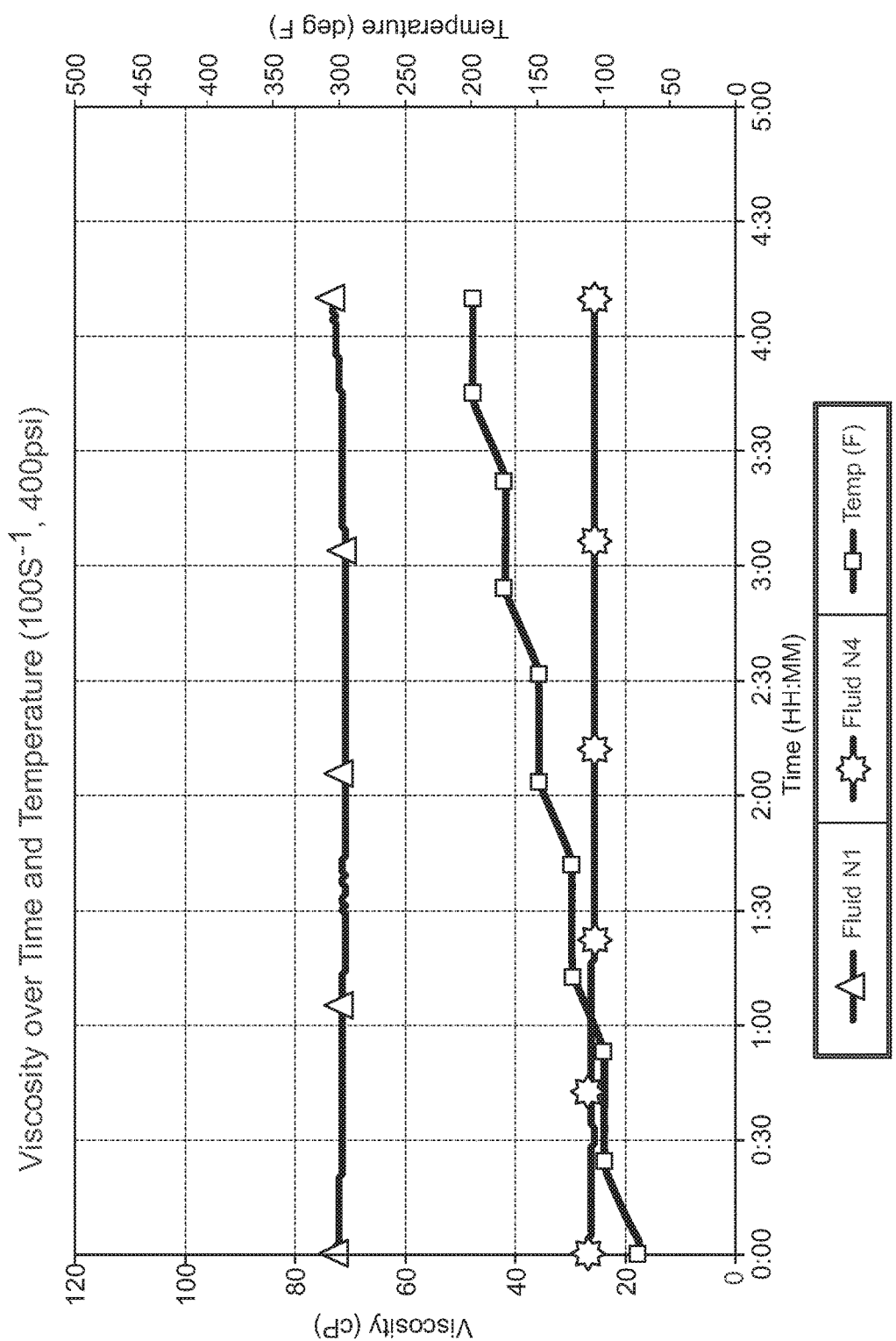

As may be seen in FIG. 4, the viscosity data for novel fluid N4 remained essentially constant over most of the temperature range and for the duration (4 hours) of testing. The stability of fluid N4 was comparable to that of fluid N1 even though the loading of suspension agent had been cut in half. Pertinent statistics are reported below in Table 2 and confirm the visual representation.

TABLE 2

| Fluid | Weighting Agent | Average (cP) | Range (cP) | AAD (cP) | TTSF (%) |
|---|---|---|---|---|---|
| N1 | Pumice 1 | 71.41 | 3.43 | 0.4100 | 0.7153% |
| N4 | Pumice 1 | 25.79 | 1.114 | 0.2399 | 0.9300% |

The statistics for novel fluids N1 and N4 show that the fluids maintained their stability over time and temperature even when loaded with lower levels of suspension agent (50% less). As expected, the viscosity of the fluid with less suspension agent had lower viscosities on average, but both fluids had very low TSSF values: about 0.72% and 0.93% respectively.

Example 3

The viscosity of another novel non-settable weighted aqueous fluid, N5, was measured over time and temperature as described in Example 1 for comparison to the data for novel fluid N3. Fluids N5 and N3 both had densities of approximately 10 ppg and were weighted with equal amounts of pumice 3 (a mixture of pumice and fly ash). The loading of suspension agent (welan gum) in fluid N5, however, was reduced by approximately 50% as compared to fluid N3. The viscosity data is presented in the graph of FIG. 5.

Figure 5:
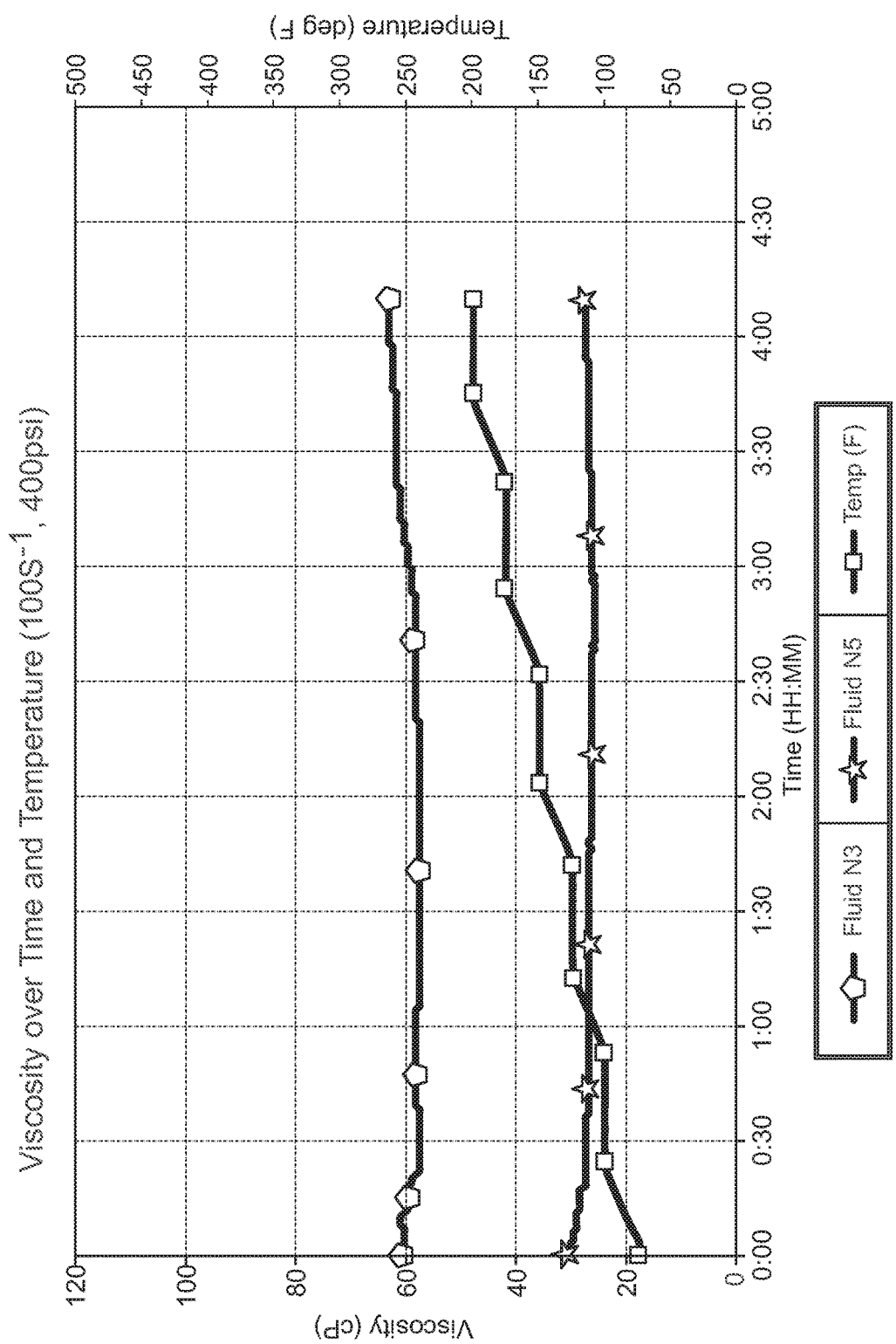

As may be seen in FIG. 5, the viscosity data for novel fluid N5 remained essentially constant over the temperature range and for the duration (4 hours) of the testing. The stability of fluid N5 was comparable to that of fluid N3 even though the loading of suspension agent had been cut in half. Pertinent statistics are reported below in Table 3 and confirm the visual representation.

TABLE 3

| Fluid | Weighting Agent | Average (cP) | Range (cP) | AAD (cP) | TTSF (%) |
|---|---|---|---|---|---|
| N1 | Pumice 3 | 59.12 | 5.614 | 1.616 | 2.733% |
| N5 | Pumice 3 | 26.72 | 5.570 | 0.5023 | 1.880% |

The statistics for novel fluids N1 and N5 show that those fluids also maintained their stability over time and temperature even when loaded with lower levels of suspension agent (50% less).

Example 4

The viscosity of fluids was measured at different shear rates, at different temperatures, and after stressing the fluid at high temperature. The fluids were the same fluids tested in Example 1 over time and temperature: fluids C1, N1, N2, and N3. The density of all fluids was approximately 10 ppg. Conventional fluid C1 contained fly ash. The three novel fluids comprised different pumices, with novel fluid N3 using a mixture of pumice and fly ash.

The fluids were tested at ambient pressure at different shear rates from 3 to 300 rpm as described above. The fluid was first introduced the sample cup at a temperature between 65-75° F., i.e., at room temperature. Viscosity data was recorded across the range of shear rates in Fann 34 dial readings (FDR).

The fluid then was transferred to the consistometer, and heated to and conditioned at 125° F. as described above. The fluids then were transferred back to the rheometer, held at 125° F., and tested over the different shear rates as before.

Fresh batches of the tested fluids were heated to and conditioned at 190° F. as described above, and then tested over the different shear rates at that temperature. Following the initial variable shear testing at 190° F., the fluid was stressed by holding it at that temperature for two hours. The shear testing then was repeated at 190° F.

The viscosity data from that testing is set forth in FIG. 6. First, it will be noted that conventional fluid C1 could not be tested for a second time at 190° F. After being held at 190° F. for two hours, the fluid had badly separated. The top section was largely free water and the bottom section had gelled and was not flowable. Even prior to stressing, the fluid showed high sensitivity to temperature at most shear levels.

In contrast, all the novel fluids weighted with pumice held up to the testing. In most instances, the viscosity of the fluids was only modestly affected by having been stressed. Fluid N1 was largely unaffected at lower shear rates. Fluid N2 was largely unaffected at lower and higher shear rates. Fluid N3, which was weighted with a mixture of pumice and fly ash, showed the greatest sensitivity after stress testing, but still was much less sensitive than conventional fluid C1. Prior to stressing, all the novel fluids were stable across the temperature testing at most all shear rates.

Example 5

The viscosity of fluids was measured at different shear rates and at different temperatures. The fluids were conventional fluid C1 tested in Examples 1 and 4, two additional conventional fluids, fluids C2 and C3, and three additional novel fluids, fluids N6, N7, and N8. All conventional fluids were weighted with fly ash. The three novel fluids all were weighted with pumice 3, the mixture of pumice and fly ash.

The novel fluids had densities of approximately 10 ppg, 11 ppg, and 12 ppg, and the density of the conventional fluids were matched for comparison.

The fluids were tested at ambient pressure at different shear rates from 3 to 300 rpm as described above. The fluid was first introduced the sample cup at a temperature between 65-75° F., i.e., at room temperature. Viscosity data was recorded in FDR across the range of shear rates.

The fluid then was transferred to the consistometer, and heated to and conditioned at 190° F. as described above. The fluids then were transferred back to the rheometer, held at 190° F., and tested over the different shear rates as before.

The viscosity data from that testing is set forth in FIG. 7. As may be seen therein, novel fluids N6, N7, and N8, which were weighted with a mixture of pumice and fly ash, in general had far greater temperature stability than conventional fluids C1, C2, and C2, which were weighted with comparable amounts of fly ash. At a single shear rate (6 rpm), fluid C1 and N6 both maintained their viscosity, and at a couple other shear rates (3 rpm and 30 rpm), the change in their viscosities was comparable. At all other rates, fluid N6 had better temperature stability than fluid C1.

Fluids C1 and N6 had densities of 10 ppg. There was a much bigger difference in temperature stability for the fluids with higher densities: fluids C2 and N7 (both 11 ppg) and C3 and N8 (both 12 ppg). The difference is particularly striking for fluids C3 and N8. Conventional fluid C3 showed dramatic thinning at the higher temperature. Novel fluid N8 was only modestly affected.

Example 6

The conventional and novel fluids tested in Examples 1 and 4 (C1, N1, N2, and N3) were tested for free fluids as described above and then tested for flowability by pouring the fluid into a beaker. The fluids were heated to and conditioned at 190° F., and then held in the over for two hours at that temperature. Fluids N1 and N2 also were tested at 125° F. Any water bleeding from the suspension will collect at the top and was measured.

Conventional fluid C1 weighted with fly ash had unacceptably high separation. The measured free fluid was 8% by volume (vol %) (measured 20 cc out of 250 cc). Settling of fly ash and the presence of a gelled component at the mid to bottom of the flask were observed. When transferred to the beaker, the gelled component fell out of the cylinder in clumps. In contrast, no fluid bled off novel fluids N1, N2, and N3 weighted with pumice at either temperature. That is, the observed free fluid was less than 1 cc. The novel fluids also showed no gelation, and all maintained highly flowable, homogeneous single-phase slurries.

Example 7

The conventional and novel fluids tested in Example 5 were tested for free fluids as described above. The fluids were heated to and conditioned at 190° F., and then held in the over for two hours at that temperature. Any water bleeding from the suspension will collect at the top and was measured.

All the conventional fluids weighted with fly ash had significant amounts of free fluid. The measured free fluid ranged from 4 vol % (measured 10 cc out of 250 cc) to 19 vol % (measured 48 cc out of 250 cc). In contrast, no fluid bled off novel fluids N6 and N7, and negligible amounts bled off novel fluid N8, all of which were weighted with pumice.

The free fluid measurements for all fluids are reported below in Table 4.

TABLE 4

| Fluid | Weighting Agent | Density (ppg) | Free Fluid (cc per 250 cc) | Free Fluid (vol %) |
| --- | --- | --- | --- | --- |
| C1 | Fly Ash | 10 | 20 | 8% |
| N6 | Pumice 3 | 10 | 0 | 0% |
| C2 | Fly Ash | 11 | 48 | 19% |
| N7 | Pumice 3 | 11 | 0 | 0% |
| C3 | Fly Ash | 12 | 10 | 4% |
| N8 | Pumice 3 | 12 | 2 | 0.8% |

Example 8

The longer-term stability or shelf life of the fluids tested in Examples 1, 4, and 6 (C1, N1, N2, and N3) was tested. After preparation, the fluids were allowed to rest. It was observed that conventional fluid C1 gelled after less than 3 hours. After about 14-17 hours, there were significant amounts of free fluid in fluid C1 while novel fluids N1, N2, and N3 had essentially no free fluid. Moreover, the novel fluids remained suspended and poured easily after 7 days.

It is believed that the testing as a whole shows that conventional non-settable aqueous fluids weighted with fly ash are highly sensitive to temperature, especially when exposed to high temperatures over longer periods of time. Their rheology changes significantly over time and temperature. The fluids are susceptible to at best significant free fluid loss and at worst complete separation and failure.

In contrast, the novel fluids have been shown to exhibit improved rheological stability. Their viscosity over time and temperature is remarkably stable. Even when stressed by extended periods of high temperature, their viscosity is only modestly affected. They bleed little or no free fluid even at elevated temperature over long periods of time. At ambient temperatures, they are stable over the course of several days. Thus, they can be expected to better maintain their viscosity over the course of delayed, extended, or interrupted operations, even when the fluid may have extended residence time in the high temperature environment in the well. Moreover, their stability is less likely to be significantly affected by differences in pumping regimes. It is expected, therefore, that the novel fluids will allow for more efficient, more cost-effective cementing operations and other treatments.

While this invention has been disclosed and discussed primarily in terms of specific embodiments thereof, it is not intended to be limited thereto. Other modifications and embodiments will be apparent to the worker in the art.

What is claimed is:

1. A non-settable weighted aqueous well fluid, said fluid comprising:
   (a) pumice; and
   (b) a suspending agent;
   (c) wherein said fluid has a time-temperature stability factor of about 10% or less; and
   (d) wherein said time-temperature stability factor is defined as the average deviation coefficient of the viscosity of said fluid over time and temperature expressed in percentage.

2. The fluid of claim 1, wherein pumice comprises at least about 60 wt % of weighting agents in said fluid.

3. The fluid of claim 1, wherein said fluid has a density of from about 8.5 to about 13 ppg.

4. The fluid of claim 1, wherein said fluid has a time-temperature stability factor of about 5% or less.

5. The fluid of claim 1, wherein said fluid has a time-temperature stability factor of about 3% or less.

6. The fluid of claim 1, wherein pumice comprises at least about 40 wt % of weighting agents in said fluid.

7. The fluid of claim 1, wherein said fluid is weighted with from about 1 to about 8 ppg of pumice.

8. The fluid of claim 1, wherein said fluid is weighted with from about 2 to about 7 ppg of pumice.

9. The fluid of claim 1, wherein said fluid comprises:
   (a) primary weighting agents selected from the group consisting of pumice and fly ash, wherein pumice comprises at least about 40 wt % of said primary weighting agents; and
   (b) wherein when said fluid has a density of less than about 13 ppg, said fluid comprises, as a percentage of all weighting agents in said fluid, less than about 5 wt % of secondary weighting agents.

10. The fluid of claim 9, wherein said fluid comprises, as a percentage of all weighting agents in said fluid, less than about 5 wt % of secondary weighting agents when said fluid has a density of less than about 12 ppg.

11. The fluid of claim 1, wherein said fluid comprises weighting agents consisting essentially of weighting agents selected from the group consisting of pumice and fly ash, wherein pumice comprises at least about 40 wt % of said weighting agents.

12. The fluid of 11, wherein pumice comprises at least about 60 wt % of said weighting agents.

13. The fluid of claim 11, wherein said weighting agents consists essentially of pumice.

14. A method of cleaning a well in preparation for injecting a cement composition into said well, the method comprising:
   (a) injecting a non-settable weighted aqueous treatment fluid into said well in advance of said cement composition, wherein said treatment fluid is a fluid of claim 1; and
   (b) energizing said treatment fluid to displace fluids present in said well.

15. A method of cleaning a well in preparation for injecting a cement composition into said well, the method comprising:
   (a) injecting a non-settable weighted aqueous treatment fluid into said well in advance of said cement composition, wherein said treatment fluid is a fluid of claim 4; and
   (b) energizing said treatment fluid to displace fluids present in said well.

16. A method of cleaning a well in preparation for injecting a cement composition into said well, the method comprising:
   (a) injecting a non-settable weighted aqueous treatment fluid into said well in advance of said cement composition, wherein said treatment fluid is a fluid of claim 5; and
   (b) energizing said treatment fluid to displace fluids present in said well.

17. A method of cleaning a well in preparation for injecting a cement composition into said well, the method comprising:
   (a) injecting a non-settable weighted aqueous treatment fluid into said well in advance of said cement composition, wherein said treatment fluid is a fluid of claim 9; and
   (b) energizing said treatment fluid to displace fluids present in said well.

18. A method of cleaning a well in preparation for injecting a cement composition into said well, the method comprising:
   (a) injecting a non-settable weighted aqueous treatment fluid into said well in advance of said cement composition, wherein said treatment fluid is a fluid of claim 11; and
   (b) energizing said treatment fluid to displace fluids present in said well.

19. A method of stabilizing a rheology of a non-settable weighted aqueous well treatment fluid over time and temperature, said method comprising:
   (a) weighting said fluid with pumice in an amount effective to provide said fluid with a time-temperature stability factor of less than about 10%;
   (b) wherein said time-temperature stability factor is defined as the average deviation coefficient of the viscosity of said fluid over time and temperature expressed in percentage.

20. A method of cementing a well, said method comprising:
   (a) providing a cleaning fluid stabilized according to claim 19;
   (b) injecting said cleaning fluid into said well and energizing said cleaning fluid to displace fluids in said well; and
   (c) injecting a cementitious slurry into said well after said cleaning fluid.

* * * * *